US010576596B2

(12) United States Patent
Bangma et al.

(10) Patent No.: US 10,576,596 B2
(45) Date of Patent: Mar. 3, 2020

(54) MINIMUM QUANTITY LUBRICATION SYSTEM

(71) Applicant: UNIST, INC., Grand Rapids, MI (US)

(72) Inventors: Timothy John Bangma, Ada, MI (US); Charles W. Boelkins, Ada, MI (US)

(73) Assignee: Unist, Inc., Grand Rapids, MI (US)

( * ) Notice: Subject to any disclaimer, the term of this patent is extended or adjusted under 35 U.S.C. 154(b) by 453 days.

(21) Appl. No.: 15/299,521

(22) Filed: Oct. 21, 2016

(65) Prior Publication Data

US 2017/0113315 A1     Apr. 27, 2017

Related U.S. Application Data

(60) Provisional application No. 62/244,978, filed on Oct. 22, 2015.

(51) Int. Cl.
| | | |
|---|---|---|
| *B23Q 11/10* | (2006.01) | |
| *F16N 7/32* | (2006.01) | |
| *F16N 13/22* | (2006.01) | |
| *F16N 29/02* | (2006.01) | |
| *F16N 7/38* | (2006.01) | |

(52) U.S. Cl.
CPC .......... *B23Q 11/1046* (2013.01); *F16N 7/32* (2013.01); *F16N 13/22* (2013.01); *F16N 29/02* (2013.01); *F16N 7/385* (2013.01); *F16N 2270/70* (2013.01)

(58) Field of Classification Search
CPC ....... B23Q 11/1046; F16N 7/32; F16N 13/22; F16N 29/02
See application file for complete search history.

(56) References Cited

U.S. PATENT DOCUMENTS

| 2,328,812 | A | * | 9/1943 | Klein | ............ F01L 25/08 137/102 |
|---|---|---|---|---|---|
| 3,062,454 | A | * | 11/1962 | Cocks | ............ B05B 7/0441 239/422 |
| 3,618,709 | A | * | 11/1971 | Boelkins | ............ F16N 7/32 137/595 |
| 3,888,420 | A | * | 6/1975 | Boelkins | ............ B05B 12/00 184/7.4 |

(Continued)

FOREIGN PATENT DOCUMENTS

| DE | 10132857 A1 | 1/2003 |
|---|---|---|
| DE | 102006030651 A1 | 1/2007 |

(Continued)

OTHER PUBLICATIONS

DE102006030651 Machine Translation (Year: 2005).*

(Continued)

*Primary Examiner* — Michael A Riegelman
(74) *Attorney, Agent, or Firm* — McGarry Bair PC (57) ABSTRACT

A MQL system for accurately measuring and controlling a volume and pressure of a lubricating fluid provided to a machining tool during minimum quantity lubrication machining operations. The MQL system can further include measuring and controlling a volume and pressure of air provided during machining such that atomization of the lubricating fluid with the air can be controlled. Use of a continuous volumetric flow pump provides a continuous flow of lubricating fluid to the tool during machining operations.

18 Claims, 3 Drawing Sheets

(56) References Cited

U.S. PATENT DOCUMENTS

| | | | | |
|---|---|---|---|---|
| 4,205,708 A * | 6/1980 | Burgbacher | ............ | D03J 1/003 139/1 R |
| 4,284,174 A * | 8/1981 | Salvana | ................ | F01D 25/18 184/6.26 |
| 4,312,424 A * | 1/1982 | Taylor | .................... | F16N 27/00 180/8.5 |
| 4,494,676 A * | 1/1985 | Berweger | ............... | F04B 13/02 222/135 |
| 4,527,661 A * | 7/1985 | Johnstone | ............ | B23Q 11/121 184/6.1 |
| 4,687,138 A * | 8/1987 | Ostergaard | ............. | B08B 3/026 239/126 |
| 4,852,693 A * | 8/1989 | Nakajima | ............... | F16N 29/04 184/6.4 |
| 4,858,645 A * | 8/1989 | Reeves | ................. | F04B 49/106 137/551 |
| 4,946,352 A * | 8/1990 | Evenson | ................. | F04B 9/115 417/396 |
| 5,020,636 A * | 6/1991 | Daeges | ................. | F04B 43/095 184/55.1 |
| 5,715,912 A * | 2/1998 | Maxwell | .................... | F16N 7/32 184/6.12 |
| 6,840,404 B1 * | 1/2005 | Schultz | ............... | B01F 15/0466 222/137 |
| 8,256,388 B2 * | 9/2012 | Aixala | ..................... | F01M 1/08 123/196 R |
| 9,616,540 B2 * | 4/2017 | Balaji | ................ | B23Q 11/1046 |
| 9,873,852 B2 * | 1/2018 | Clarens | ................ | C10M 111/04 |
| 2002/0071771 A1 * | 6/2002 | Miller | ..................... | F04B 9/113 417/285 |
| 2003/0123940 A1 * | 7/2003 | Hubbard | ............ | B23Q 11/1084 408/1 R |
| 2003/0159889 A1 * | 8/2003 | Johnson | ................ | B65G 45/02 184/15.3 |
| 2005/0241882 A1 * | 11/2005 | Grozinger | .......... | B23Q 11/1046 184/50.2 |
| 2012/0031705 A1 * | 2/2012 | Divisi | ....................... | F16N 7/32 184/55.1 |
| 2015/0330564 A1 * | 11/2015 | Mueller | .................. | F16N 25/00 184/7.4 |
| 2016/0158784 A1 * | 6/2016 | Fehr | ........................ | B05B 15/55 239/1 |
| 2017/0066097 A1 * | 3/2017 | Bangma | ............. | B23Q 11/1046 |
| 2017/0113315 A1 * | 4/2017 | Bangma | ............. | B23Q 11/1046 |

FOREIGN PATENT DOCUMENTS

| | | |
|---|---|---|
| DE | 102015005634 A1 | 8/2015 |
| EP | 2416052 A2 | 2/2012 |

OTHER PUBLICATIONS

DE10132857—Machine Translation (Year: 2001).*

European Search Report for Counterpart EP16195209.8, dated Mar. 31, 2017.

* cited by examiner

MINIMUM QUANTITY LUBRICATION SYSTEM

CROSS-REFERENCE TO RELATED APPLICATIONS

This application claims priority to U.S. Provisional Patent Application No. 62/244,978, filed on Oct. 22, 2015, the entirety of which is incorporated herein by reference.

BACKGROUND OF THE INVENTION

Minimum Quantity Lubrication (MQL) is a process-sensitive approach to metal cutting lubrication. To achieve optimum results it is important to both know the amount of lubricant being applied and have the lubricant applied in a continuous or near-continuous manner. These two approaches have often been at odds with each other. Making the problem more difficult, is the wide range of flow rates required from the pump, such as 1 to 500 ml/hr., and the high pressure into which the pump must discharge fluid through the spindle system, up to 10 bar.

The standard industry approach to controlling the fluid flow is to use a pressurized fluid supply with a metering element that opens for a fixed period of time to allow a known amount of fluid to flow. To finely control this amount the metering element is opened and closed rapidly. To achieve the required accuracy, a manual calibration of the actual fluid flow through the specific metering element is required. Since fluid properties are dependent on fluid conditions, including viscosity, which changes with temperature, this approach has inherent difficulties. Attempts are being made at addressing these issues, for example, the development of "smart" valves (see DE102015005634A1), however the problems of consistency are inherent in the time based flow approach and such smart valves are much more complex than the inventive approach given in this disclosure.

An alternative to the time and flow approach is to use a volumetric pump. Because fluid viscosity changes with temperature, a metered volumetric dosing approach is often best for ensuring the amount of fluid delivered is consistent. Since it is volume based, it is insensitive to the fluid viscosity changes. There are several common designs of metering pumps, such as diaphragm, peristaltic, and gear pumps, but these generally cannot deliver the fluid at the full range of both rates and pressures necessary in the high-pressure, low flow, though-the-spindle metal-cutting environment. Some of these pumps can be practical in external MQL applications where the fluid is being discharged into atmospheric pressure, but the need to overcome the high compressed air back pressure inside a machine spindle make them impractical for through-the-spindle MQL systems. Others of these pumps can provide the necessary pressure, but only at much higher output rates than required for MQL applications.

Because of their ability to work reliably at the given conditions, several current MQL applicators use positive displacement single piston pumps. These pumps are typically operated with compressed air and deliver a low volume "shot" of fluid every time they stroke. They typically have outputs of about 0.03 mL/stroke and they are stroked repeatedly to generate the required flow rate. A negative aspect of this current implementation is that fluid is only delivered during the stroke phase of the pump and not as the pump chamber is refilled, so the output is pulsed. This is undesirable for consistent lubrication of the cutting tool and can cause issues when the cutting operation is shorter than the time between strokes.

To alleviate the pulsed output, operate at the required pressure, and deliver the small amounts of fluid needed, most current through-the-spindle MQL systems use a pressurized fluid supply with a metering element. This is typically done with a valve that opens and closes several times a second. Although this method provides an output which approximates continuous flow, it requires calibration for different liquids, is again sensitive to changes in viscosity and has a relatively large percentage of error at low flow rates.

BRIEF DESCRIPTION OF THE INVENTION

In one aspect, the invention relates to a minimum quantity lubrication (MQL) system for supplying air and lubrication to a tool, includes an air supply line configured to fluidly couple to the tool and an air supply valve fluidly coupled to the air supply line controlling a volumetric flow rate of air through the air supply line. A lubricant supply line fluidly couples to the air supply line. A volumetric flow pump fluidly couples to the lubricant supply line and supplies a supply of lubricant at a lubricant flow rate through the lubricant supply line. A controller operably couples to the air supply valve and the volumetric flow pump. The controller operates the volumetric flow pump to supply a continuous flow of the supply of lubricant at a known and constant lubricant flow rate to the air supply line.

In yet another aspect, the invention relates to a method of supplying minimum quantity lubrication (MQL) to a tool. The method includes: (1) supplying a supply of air to the tool from an air source; (2) supplying, with at least one volumetric flow pump, a continuous supply of lubricating fluid to the supply of air; (3) controlling, with a controller, the supplying of lubricating fluid from the volumetric flow pump to supply a known and constant flow rate of lubricating fluid to the tool or the supply of air.

DESCRIPTION OF EMBODIMENTS OF THE INVENTION

Figure 1:
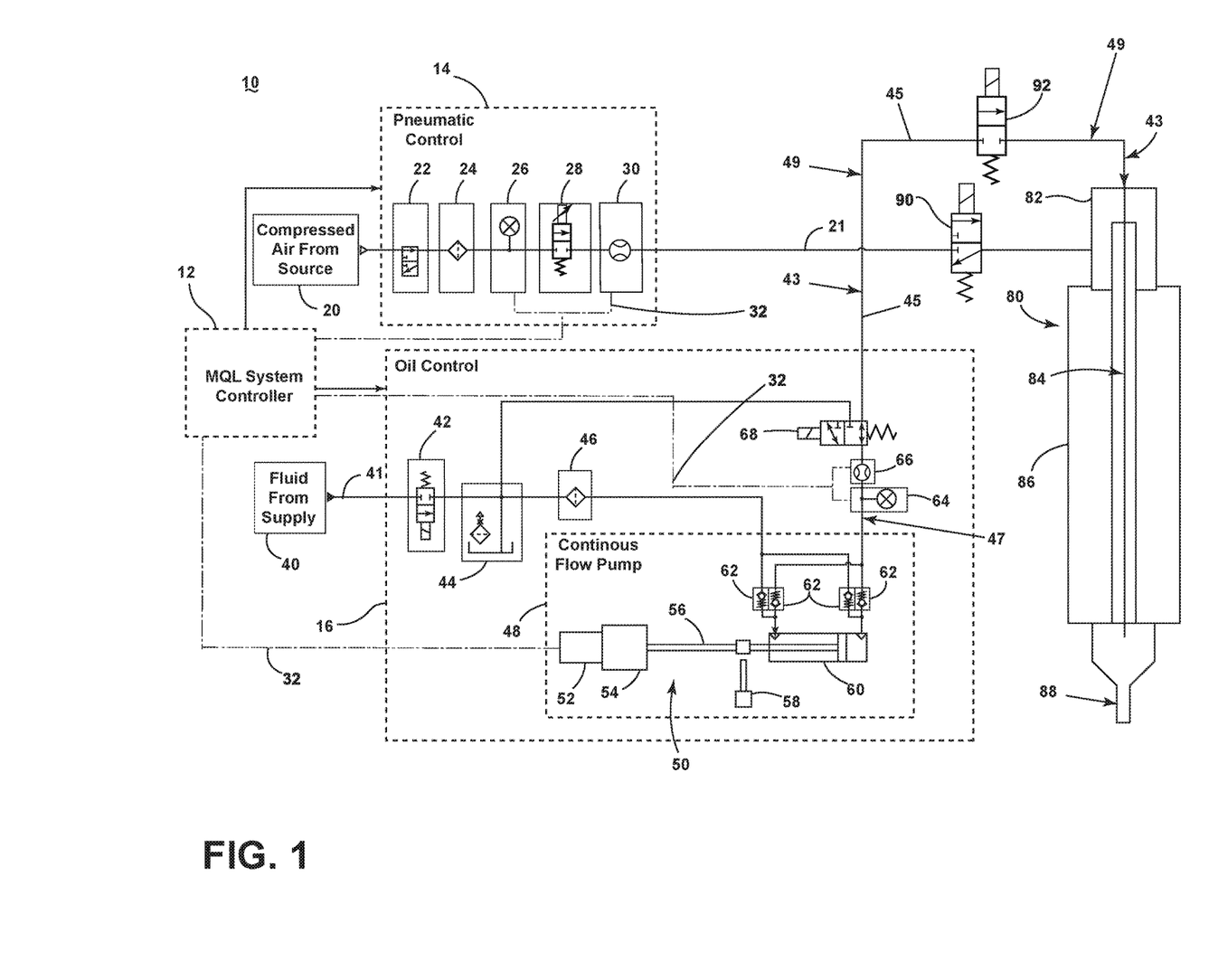
FIG. 1 is a schematic view illustrating a system for delivering minimum quantity lubrication to a rotating tool assembly.

The overall system schematic 10 with a dual action pump is shown in FIG. 1. A MQL system controller 12 controls both a pneumatic control 14 and a fluid control 16. The controller 12 can be operated by an operator though a user interface (not shown), or by an external controller, to control the pneumatic control 14 and the fluid control 16. The fluid control 16 can provide a controlled supply of lubricant, such as oil. The controller 12 can receive input from the user interface (not shown), such as air supply data, lubricant supply data, or data related to an algorithm such as an air-to-lubricant ratio, in non-limiting examples. It is contemplated that the controller can be a microprocessor-based controller that implements control software and sends/receives one or more electrical signals to/from each of the various working components to affect the control software. Additionally, the controller 12 can include a memory for storing information, such as control software, input information, data from the user, or other signals received at the controller 12.

The pneumatic control 14 can be provided with a flow of compressed air from an air source input 20 providing air to an air supply line 21. The compressed air from the input 20 is provided to the pneumatic control 14 where the compressed air passes through a three-way slide valve 22, an air filter 24, an air pressure transducer 26, a proportional air valve 28, and an air flow meter 30. The valve 22 can be used to shut off the flow of air or control the volumetric flow rate of the air passing through the air supply.

The air fed through the three-way slide valve 22 passes to an air filter 24 for ensuring the air is removed of particulate matter before passing into the downstream system. From the air filter 24, the air passes to an air pressure transducer 26 to determine the pressure of the air passing from the source 20. The determined air pressure can be converted into an analog signal and sent to the controller 12, for example, to record the pressure from the source 20. A communication conduit 32 can be used to provide information or a signal thereof from the air pressure transducer 26 and the air flow meter 30 to the controller 12. The controller 12 can send a signal to the air valve 28 based upon the information from the air pressure transducer 26 and the air flow meter 30 to control the proportional air valve 28 to control the volumetric flow rate of the air, in one example.

Air from the pressure transducer 26 can pass to the proportional air valve 28. The controller 12 can control the proportional air valve 28 to change the flow rate of the air being fed from the pneumatic source 20 by electronic signal, such as from the controller 12. The proportional air valve 28 can be used to ensure that the proper air flow is being fed from the pneumatic control 14. From the proportional air valve 28, air is fed through an air flow meter 30 that can be used to measure the volume of air passing from the source 20, downstream of the proportional air valve 28.

Thus, the pneumatic control 14 can be used to determine a pressure and a volumetric flow rate of the flow of pressurized air from a compressed source 20, and control the volume of the airflow from the source 20 with the proportional air valve 28. This information can be used to accurately determine both the pressure and volume of air being provided within the MQL system 10.

The fluid control 16 can be fed with a supply of fluid lubricant, such as oil, from a fluid supply 40 along a lubricant supply line 41. The lubricant supply line 41 includes a high pressure fluid line 45 fluidly coupled with the air supply line 21 or a lubricating tool, or both to supply lubricating fluid to the tool. The high pressure fluid line 45 can include the components of and the lubricant supply line 41 that are operating under an increased pressure to supply pressurized lubricating fluid to the air supply line 21. The lubricating fluid from the supply 40 along the lubricant supply line 41 can be controlled at a valve 42 for selectively providing the lubricating fluid to a reservoir 44 for holding the lubricating fluid. The lubricating fluid can be provided from the reservoir 44 directly to a fluid filter 46. The fluid filter 46 ensures that the fluid is removed of all particulate matter before passing to the downstream system components. The fluid lubricant fed from the fluid supply 40 can be pressurized as desired, such that the fluid can be fed with a determinable pressure that can be controlled by the system controller 12 to fill reservoir 44.

The lubricant supply line 41 can be a combination of one or more elements to define a flow path for the lubricating fluid. Such elements can include tubing, valves, flow meters, a fluid delivery tube, and at least one rotating union in non-limiting examples. The lubricant supply line 41 can include a high pressure region 43 that contains all pressurized components downstream of the continuous flow pump 50 along the high pressure fluid line 45. Such elements include a rotating union 82, a fluid delivery tube 84, and the high pressure lubricant line 45, for example. The high pressure lubricant line 45 can be made of materials with a high modulus of elasticity, also known as a Young's Modulus. For example, the tubing can be made of hard nylon or stainless steel. Maximizing the modulus of elasticity along the high pressure lubricant line 45 can minimize changes in the flow rate by minimizing or eliminating volumetric changes in the high pressure lubricant line 45, such as expansion due to the high pressure of the system. With a high modulus of elasticity, having minimal or no local system expansion under the high backpressure, expansion of the high pressure lubricant line 45 is minimized or eliminated, while maintaining any necessary flexion of the high pressure lubricant line 45. This provides for a consistent, known, continuous flow of lubricating fluid during operation or between operations.

Additionally, at least a portion of the high pressure lubricant line 45 can include a non-expandable portion 47 and at least a portion of the high pressure lubricant line 45 can include a minimally expandable portion 49. The non-expandable portion 47 will not change local volume under the high backpressure being overcome by the continuous flow pump 50, while the minimally expandable portion 49 will only slightly expand under the backpressure, as necessary. A high modulus of elasticity at both the non-expandable portion 47 and the minimally expandable portion 49 can ensure that the desired expansion or lack thereof is controlled. In one example, the non-expandable portion 47 can be made of stainless steel, and the minimally expandable portion 49 can be made of hard nylon, while equivalent materials are contemplated.

Furthermore, the high pressure region of the lubricant supply line 43 can be adapted to minimize cavities to minimize the collection of entrapped air within the cavities. Such cavities can form, for example, from manufacturing imperfections, such as resulting from the extension of a drill tip, or loose tolerances to ensure fit of components. The formation of such cavities through the high pressure region 43 of the lubricant supply line 41 can provide for collection of entrapped air within the cavities. The collected air is compressible at the high pressure of the high pressure region 43, and, when compressed, changes the local volume of the high pressure region 43 of the lubricant supply line 41. Minimizing such cavities minimizes the collection of air and minimizes the volume changes. Thus, compressible material within the high pressure region 43 of the lubricant supply line 41 is minimized.

Further still, the high pressure region 43 of the lubricant supply line 41 contains a volume of lubricating fluid. The lubricating fluid can include entrained air. Such entrained air is compressible. The lubricant volume contained in the high pressure region 43 of the lubricant supply line 41 can be minimized, decreasing the volume of entrained air within the high pressure region 43 of the lubricant supply line 41. As such, compression of such entrained air is minimized, maintaining the continuous, known, and constant supply of lubricating fluid. All the elements of the high pressure region 43 of the lubricant supply line 41, such as valves and couplers, can have internal cavities sized and shaped to minimize the total volume. Similarly, the high pressure lubricant line 45 or internal passages within components among the high pressure lubricant supply line 45 can include a decreased internal diameter to minimize the total volume. An internal diameter of the high pressure lubricant line 45 can be determined as a function of the needed flow rate of the supply of lubricating fluid, the induced pressure increase caused by the reduced diameter, the required velocity of the flow of lubricant, or a combination thereof. The diameter can be minimized, while maintaining the continuous, known, and constant flow of lubricant. Such a sufficient flow can be based upon the backpressure of the system. As diameter is decreased, the pressure required to maintain the flow of lubricant through the high pressure region 43 of the lubricant supply line 41 is increased, increasing the overall backpressure. A balance can be struck between pressure, velocity, and diameter of tubing in the high pressure region 43 of the lubricant supply line 41 to minimize the diameter and increased backpressure, while maintaining the flow rate of the lubricating fluid.

The lubricating fluid passing through the fluid filter 46 is provided to a pump system 48 comprising a continuous flow pump 50. The continuous flow pump 50 comprises an encoder 52, a motor 54, an actuator 56, a sensor 58, and a positive displacement pump 60, capable of outputting a known, constant, and continuous supply of lubricant. The positive displacement pump 60 can be a dual action, positive displacement, volumetric flow pump. The volumetric flow pump can provide the lubricant flow at the known, constant, and continuous lubricant flow rate unimpeded by a high backpressure. As such, the flow rate is maintained, and discrete changes in the flow rate are minimized or eliminated, even under a high backpressure. Such a high backpressure can be caused by air in the MQL system 10 from air supply line 21 provided to the tool downstream. Additionally, minimizing the volume of lubricant in the high pressure region 43 of the lubricant supply line 41 can increase the backpressure on the lubricant supply line 41. The tool, in particular, can limit airflow to create a high backpressure. The volumetric flow pump, can deliver the flow of lubricant unimpeded by the high backpressure created at the tool. Such a backpressure can be up to 10 bar, for example.

Additionally, the continuous flow pump 50 as a positive displacement pump 60 can have at least one input and at least one output to support a wide range of lubricant flows. Having multiple inputs and outputs can be used to adapt the flow rates of the lubricant passing through the pump 60, while the rate of operation of the pump can be used to further discretely control the flow rates.

Furthermore, the volumetric flow pump can be two or more volumetric flow pumps. The pumps can be fluidly coupled, and organized, for example, in parallel. The two or more volumetric flow pumps can be organized to minimized changes in the lubricant flow rate. For example, the pumps can be organized to change piston direction at different times, to minimize the changes in the flow rate during the changes in piston direction by simultaneously supplying fluid from the other pump. Furthermore, the other pump can be adapted to change the flow rate, such as increasing, during the piston change of the first pump, in order to maintain the proper flow rate. Thus, it should be understood that using, controlling, monitoring, and organizing two or more pumps complementary to one another can be used to minimize or even eliminate any variation in flow rate provided from the volumetric flow pump.

The motor 54 can be, for example, a stepped motor 54 that can convert the rotational movement of the motor 54 into linear movement for actuating the actuator 56. The actuator 56, driven by the motor 54, reciprocates a piston disposed within the positive displacement pump 60. A sensor 58, such as a proximity sensor, determines a known position of the actuator 56. The encoder 52 can measure the position of the actuator 56 and therefore the output from the positive displacement pump 60 based upon position and actuation of the actuator 56. The measurements made by the encoder 52 can be provided to the system control 12 in order to send a signal to control the speed of the motor 54.

The communication conduit 32 can communicatively couple the encoder 52 to the controller 12. For example, using the position of the actuator 56, the encoder 52 can be used to measure the volumetric output or flow rate from the positive displacement pump 60. The encoder 52 can provide measurements of the position of the actuator, or driving rates thereof to the MQL system control 12. The MQL system controller 12 can then send a signal to the motor 54 to control the speed at which the actuator 56 drives the piston within the positive displacement pump 60, controlling the rate or volume of fluid provided from the positive displacement pump 60. Additionally, the controller 12 can operatively control the motor 54 at the encoder to increase or decrease the operational speed of the actuator 56. This can be done discretely, such that discrete actuations of the actuator 56 are accelerated or decelerated on an individual-stroke basis.

The lubricating fluid from the reservoir 44 is provided to the positive displacement pump 60 through one or more check valves 62. The positive displacement pump 60 can provide a continuous or near-continuous flow of lubricating fluid, which can also pass through one or more check valves 62. A near-continuous flow can include a flow with small stops in the continuous flow, such as during the changing of stroke direction of a piston in a pump. As illustrated, the positive displacement pump 60 is provided with a flow of lubricating fluid at two locations through one check valve 62 at each location, and pumps the lubricating fluid out through additional one check valve 62 at each location, comprising four total check valves 62. The check valves 62 insure that the lubricating fluid is drawn from upstream of the positive displacement pump 60 and is moved downstream of the positive displacement pump 60 without any backflow.

Downstream of the positive displacement pump 60 and check valves 62 is a fluid pressure transducer 64. The fluid pressure transducer 64 measures the pressure of the fluid from the positive displacement pump 60 and generates a signal based upon the pressure. From the fluid pressure transducer 64, the lubricating fluid can move to a fluid flow meter 66 where the volume of fluid moving from the positive displacement pump 60 can be measured. The fluid flow meter 66 can generate a signal based upon the volume of fluid and send the signal to the system control 12 representative of the volume of fluid.

A communication conduit 32 can communicatively couple the fluid pressure transducer 64 and the fluid flow meter 66 to the controller 12. The fluid pressure transducer 64 and the fluid flow meter 66 can be used to generate a signal representative of the pressure and volume of fluid from the positive displacement pump 60. The pressure measured by the fluid transducer 64 is also representative of the pressure of air provided by the proportional valve 28 due to the mixing of the air and oil in downstream components.

The system controller 12 can use the signal from the encoder 52 to control the motor 54 to operate the actuator 56 at a faster or slower rate, controlling the volume of lubricating fluid provided from the positive displacement pump 60.

It should be appreciated that the positive displacement pump 60 as illustrated is exemplary. The pump can be a dual action pump, such as the positive displacement pump, or can be multiple single action pumps that can be configured to give continuous or near continuous output of lubricating fluid. A continuous or near-continuous output of lubricating fluid should be understood as a constant volumetric output of fluid, such as a stream, or a constant output over time only interrupted for a brief instant when the pump piston changes direction or while switching between multiple single action pumps. For purposes of this description, continuous means both continuous or near-continuous, only pausing briefly, such as during the pump piston stroke change.

The positive displacement pump 60 can provide the continuous output of lubricating fluid at a known, precise, constant, and continuous or near-continuous flow rate. The output of the lubricating fluid can be known based upon the internal volume of the positive displacement pump 60 and the rate at which the pump 60 is operating. In this manner, using the known volume, a flow rate can be determined. This flow rate can be a precise flow rate over time, as the known volume can be used to provide a precise flow of lubricating fluid at a precise rate. Such a rate can be constant over time, providing the precise flow rate for a desired period within the MQL system 10. The positive displacement pump 60 enables continuous or near-continuous provision of the lubricating fluid at the flow rate, inherent in the positive displacement pump 60. A near-continuous flow should be understood as generally equivalent to a continuous flow, only pausing briefly during a change in stroke direction. Such a continuous provision enables the precise, constant flow of lubricating fluid. Utilizing the precision of the positive displacement pump 60, the user of the MQL system 10 can supply the lubricant or lubricating fluid to a tool at such a precise flow rate. Additionally, the supply to the tool in the MQL system 10 requires significant pressure, often generated by the supply of air. The positive displacement pump 60 can provide the precise flow of lubricating fluid despite a large backpressure generated within the MQL system 10. The high system backpressure can be up to 10 bar or more, for example.

Downstream from the fluid flow meter 66 can be a diverter valve 68. The diverter valve 68 can be used to selectively provide a flow of lubricating fluid downstream or return the fluid to the reservoir 44.

The diverter valve 68 is used in conjunction with the fluid flow meter 66, the continuous flow pump 48, and the MQL system controller 12 to perform the automatic calibration of the fluid flow meter 66 for the fluid from the reservoir 44. The MQL system controller 12 runs the continuous flow pump 48 at a fixed set of flow rates. The values are read from the flow meter 66 for each of the flow rates and a table of calibration values is generated and stored in the MQL system controller 12. This calibration table is used by the MQL system controller 12 to convert the values generated by the fluid flow meter 66 into actual flow rates for monitoring and reporting purposes when the MQL system 10 is operating.

The pneumatic system 14 controls the airflow through a tool holder assembly, which can be a spindle system or rotating tool assembly 80, and the fluid control system 16 controls the flow rate of the fluid. A rotating union 82 is mounted on the spindle 86, which, in turn, is mounted in the machine-tool system, with the fluid delivery tube 84 positioned axially down the center of the spindle 86. Air and oil are delivered separately to the rotating union 82. The rotating union 82 is designed to keep these separate and the air flows outside of and around the fluid delivery tube while the oil is transferred through the spindle 86 inside of the fluid delivery tube 84. The tool 88 and tool assembly 80 can be clamped into the spindle 86 and coupled to air and oil passage such that the air and oil are mixed in the tool 88 and tool assembly 80 and the resulting MQL aerosol is delivered out the end of the tool 88 and tool assembly 80.

A spindle vent valve 90 can be placed upstream of the spindle 86 to relieve any pressure in the spindle 86 prior to removal of the tool 88 and tool assembly 80. The spindle vent valve 90 maintains the system pressure upstream of the spindle system 80 in order to remove or change the tool 88 and tool assembly 80 without needing to depressurize or re-pressurize the system.

Entrained or entrapped air within the high pressure region 43 of the lubricant supply line 41 will compress when pressurized fluid is provided from the continuous flow pump 50, having the potential to impact the consistency of the fluid output. Components of the high pressure region 43 of the lubricant supply line 41 with a relatively low elastic modulus (Young's Modulus) will expand when the pressurized fluid passes through the components or the fluid disposed therein is put under pressure. In addition, air entrained in the lubricant or entrapped in components of the high pressure region 43 of the lubricant supply line 41 can also cause a pressure related change in the volume of the high pressure region 43 of the lubricant supply line 41. The total volume change due to the combination of the expansion of components or compression of air can be thought of as an overall system elasticity. This system elasticity generates a delay between when the system receives a signal to start delivering fluid and when the fluid begins to exit the fluid delivery tube 84. Similarly, such system elasticity can force the fluid out of the fluid delivery tube 84 after the signal to stop fluid delivery has been received, due to compression of components and expansion of entrained and entrapped air during depressurization. To negate the effects of this system elasticity, a pressure maintenance valve 92 is provided upstream of and near the rotating union 82. As such, the pressure maintenance valve 92 is placed as close to the fluid delivery tube 84 as possible. This allows the fluidic system to be held under pressure prior to, during, and after operation eliminating the need for the re-compression of the fluid on when receiving the start signal, holding the pressure when the fluid delivery is stopped, and minimizing the negative effects of the compression and expansion. Additionally, the components can be implemented and interconnected minimizing the potential for entrained air, as well as using components having a higher elastic modulus to minimize the compression or decompression within the high pressure region 43 of the lubricant supply line 41.

While through-spindle MQL systems that keep the oil and air separated as they travel through the spindle are well known, a volumetric pump based applicator that can continuously deliver fluid with high accuracy using a volumetric pump over the required range of fluid delivery rates and into high-pressure environments is not. High-pressure environments require such a great amount of pressure that generating a continuous, accurate flow of air, lubricant, or both is difficult. Valves and pumps used to achieve great pressures are often inaccurate, or susceptible to the great pressures, which can alter the flow rates provided from the valves or pumps. Additionally factors throughout the pump system can have an impact on the fluid delivery rates, such as wear on the system, conduit cross-sectional areas, fluid viscosity, or temperature in non-limiting examples. The MQL system as described herein provides for highly accurate fluid delivery ranges within such high-pressure environments.

In operation, the input or data received to the controller 12 can be used to operate the MQL system 10 particular to the tool 88 and tool assembly 80. For example, the input can be or can be used to develop an algorithm for providing a supply of air and lubricant, or a mixture thereof to the tool 88 and tool assembly 80. Measurements made by the air and fluid sensors 26, 30, 64, 66 can be used to provide a signal to the controller 12 to operate the air and lubricant supplies, such as the valves 28, 62, or pumps 50, to accurately provide a mixture of lubricant and air to the tool 88 and tool assembly 80.

Figure 2:
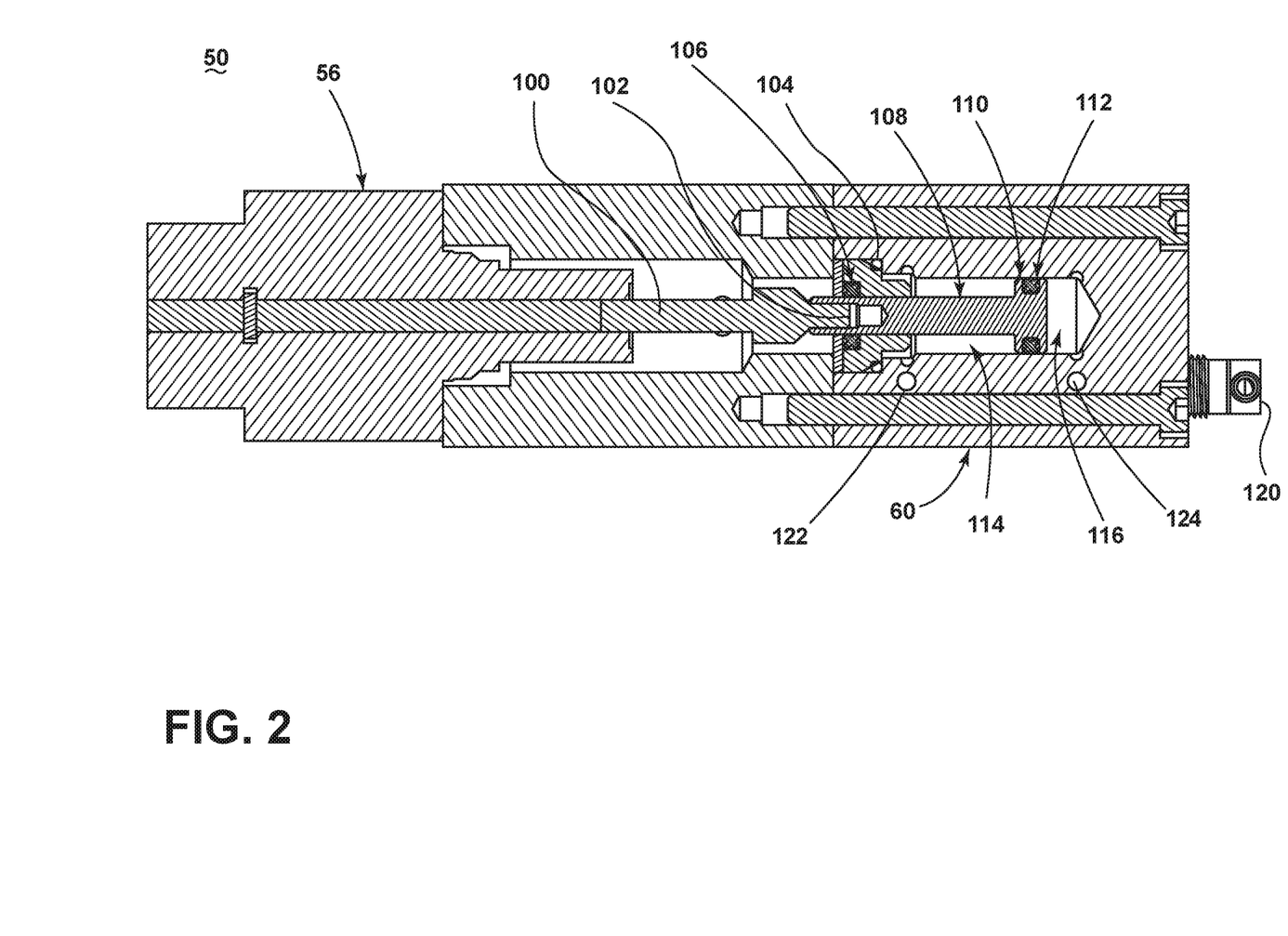
FIG. 2 is a cross-sectional view of a positive displacement pump for providing lubrication to the tool of FIG. 1 in a controlled manner.

The lubricating fluid is pulled from the reservoir 44, through the fluid filter 46, and through one of the two pump inlet check valves 62 connected to inlet ports on either side of the positive displacement pump 60. To achieve continuous delivery into high-pressure or high backpressure environments, a pump shown in FIG. 2 is used and controlled as described. The positive displacement pump 60 includes at least one input 122 and output 124 to support a wide range of flow rates through the positive displacement pump 60. The lubricating fluid is fed into two different volumes within the positive displacement pump 60, comprising a first pump chamber 114 and a second pump chamber 116. A piston rod 108, mounted at a housing 104, reciprocates the pump piston 110 and when the volume on one side of the piston increases, the other decreases. The piston rod 108 and the pump piston 110 both are provided with one or more seals 106, 112 such that lubricating fluid within the two different chambers 114, 116 does not leak therefrom. The pump piston 110 is driven by an actuator rod 100 mounted to the pump piston 110 at a mount 102 such that the actuator 56 drives the pump piston 110 at a rate at enabling calculation of a fluid flow rate. The rate at which the actuator 56 drives the piston pump 110 can be controlled to deliver the desired flow rate during delivery of a lubricating fluid during the pump stroke, as well as monitor and control the lubricant flow rate at the controller 12 (FIG. 1) based upon the rate at which the piston 110 is driven. Additionally, the piston drive rate can be controlled and optimized to reduce the number of direction changes of the piston 110. For example, if a pump stroke was 30 seconds long, and each machine operation is 25 seconds, the pump stroke will supply one operation. Then for a second operation, the pump will supply 5 seconds, change direction, and supply 20 seconds. Then for a third operation, the pump will supply 10 seconds, change direction, and supply for 15 seconds, and so on. However, if the piston could change directions in a controlled optimized manner, such as between operations, without completing the entire pump stroke, the pump could provide fluid supply for 25 seconds consistently for each operation, as opposed to changing piston direction. As such, the supply rate can be known, consistent, and continuous. Alternatively, the rate of the piston 110 can be discretely accelerated at the transition of the stroke direction or decelerated during the pump stroke to minimize the transition time required during direction change of the piston pump 110, while maintaining the flow rate. Additionally, the pump system 48 (FIG. 1) can be adapted to minimize the number of total pump piston transitions to optimize the continuous flow of the lubricating fluid. The lubricating fluid flows through the inlet check valve 62 (FIG. 1) on the increasing side of the positive displacement pump 60 and fills that chamber. Fluid flows out of the decreasing side of the positive displacement pump 60 and is pushed through an outlet port 120 and to the respective check valve 62 (FIG. 1). The lubricating fluid is then provided to the pressure transducer 64 (FIG. 1) and flow meter 66 (FIG. 1) to measure the fluid's pressure and flow rate. The fluid flow is provided to the point of MQL application or returned through the diverter valve 68 back to the reservoir 44 (FIG. 1).

The actuator rod 100, which is reciprocated by actuator 56, can be driven by the motor 54 (FIG. 1) or any other driving device. The size of the chambers 114, 116 and the rate at which the actuator 56 drives the piston 110 can determine a flow rate provided from the continuous flow pump 50.

Using feedback from the fluid pressure transducer 64, the fluid flow meter 66, both, or other sensors, the controller 12 can accelerate or decelerate the actuator 56 to vary the speed of the piston 110. A particular acceleration profile of the piston 110 can be developed to optimize the transition of the stroke direction of the piston 110. Optimizing the acceleration profile of the piston 110 can minimize the transition time required during direction change of the piston 110.

The continuous flow pump 50 does not need calibration of the fluid output itself. Using a known output of fluid based upon pump chamber sizes provides for calibrating other sensors in the system. Most fluid flow sensors that work at the very low flow rates are based on measuring changes in fluid properties, such as the amount of heat the fluid absorbs as it passes over a heating element. This requires a per-fluid calibration. However, because the volumetric pump independently delivers a known amount of fluid, the calibration of this sensor can be done automatically and programmatically. Thus, a user will not need to re-calibrate the system 10 based upon each utilized tool 88 and tool assembly 80. A known amount of fluid can be pumped through the sensor and back into the fluid supply at the reservoir 44, allowing an accurate and automated calibration.

Figure 3:
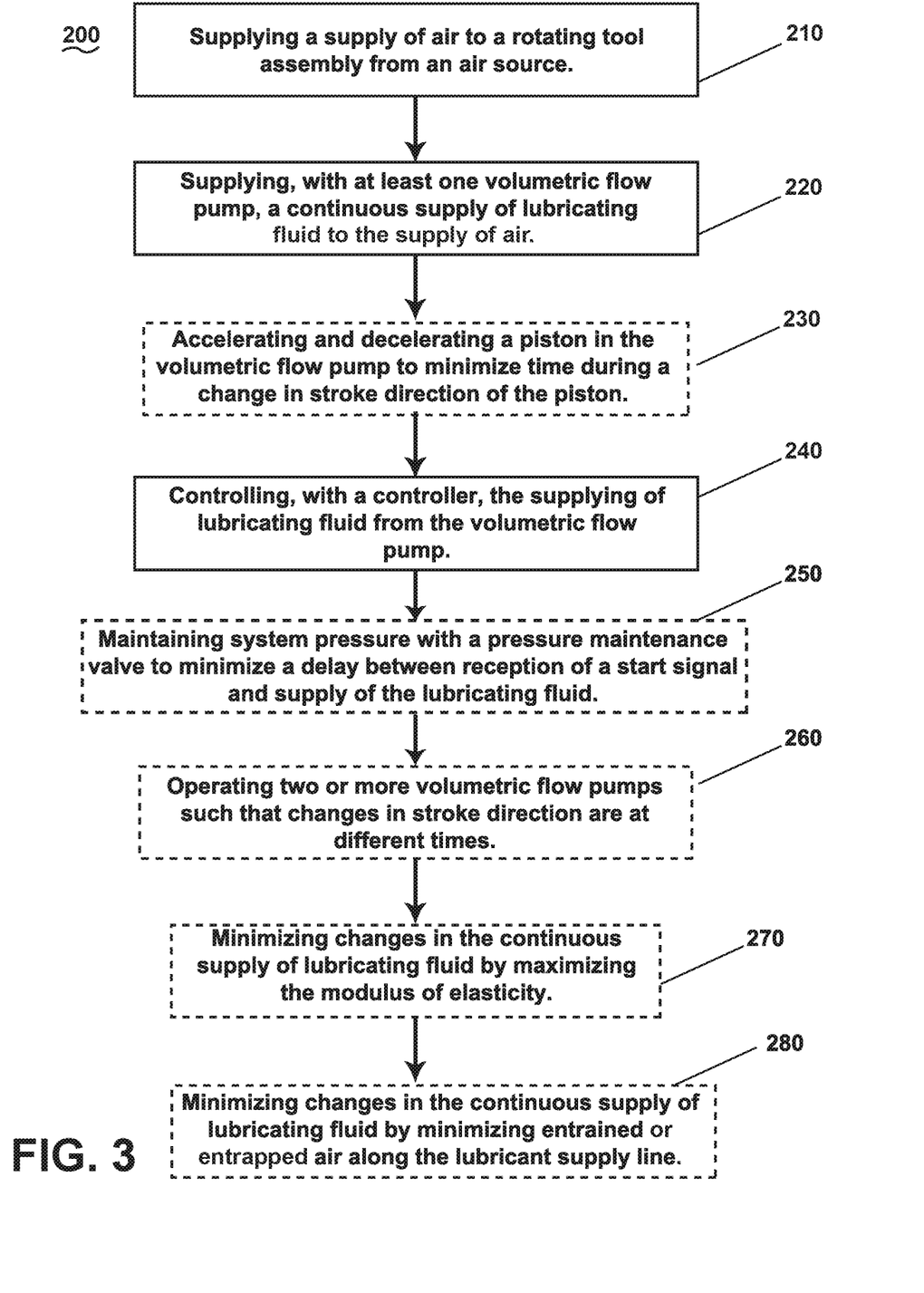
FIG. 3 is a flow chart illustrating a method of supplying minimum quantity lubrication to the rotating tool assembly of FIG. 1.

Referring now to FIG. 3, a method 200 of supplying minimum quantity lubrication to a rotating tool assembly is illustrated as a flow chart. It should be understood that the order of the flow chart is non-limiting, and that particular steps of the chart can be performed in any order.

The method 200 of supplying minimum quantity lubrication (MQL) to a tool can include (1) supplying a supply of air to the tool from an air source, (2) supplying, with at least one volumetric flow pump, a continuous supply of lubricating fluid to the supply of air, and (3) controlling, with a controller, the supplying of lubricating fluid from the volumetric flow pump with the controller to supply a known and constant flow rate of lubricating fluid to the supply of air.

At step 210, a supply of air can be supplied to a rotating tool assembly from an air source, such as supplying the air from the source 20 to the rotating tool 88 and tool assembly 80. At step 220, the method can further include supplying, with at least one volumetric flow pump, a continuous supply of lubricating fluid to the supply of air. Such a volumetric pump can be the pump as described herein, such as the dual action positive displacement pump. For example, the fluid reservoir 44 can provide a volume of lubricating fluid to the continuous flow pump 50, which supplies the fluid via the air supply line 21 to the rotating tool 88 and tool assembly 80 in a continuous manner. Examples of the continuous flow pump can include a positive displacement pump, multiple pumps organized to provide a continuous flow, or any other continuous flow pump in non-limiting examples. Additional examples of a continuous flow pump can include a push/pull syringe pump, an axial or continuous-flow rotary pump, in non-limiting examples. Additionally, at least one sensor can measure at least one of an air pressure or flow rate of the supply of air from the source 20. The sensors, for example, can be the air pressure transducer 26 or the air flow meter 30, in non-limiting examples. Other examples of air sensors can include a mass flow sensor, hot wire sensor, cold wire sensor, volume air flow sensor such as a vane meter, vortex sensor, membrane sensor, or laminar flow elements. Furthermore, the sensors can make other measurements, such as an air temperature or other air properties in non-limiting examples.

At step 230, the method can optionally include accelerating and decelerating a piston in the volumetric flow pump to minimize time during a change in stroke direction of the piston. The piston being driven can be accelerated during the transition of the piston stroke direction to minimize any minute delay in the feed of fluid by the pump. In order to maintain the flow rate, the piston can be decelerated during the remainder of the stroke to maintain the flow rate relative to the acceleration during stroke transition. At step 240, the method can include controlling, with a controller, the supplying of lubricating fluid from the volumetric flow pump. The controlling can include controlling the pump to supply a continuous flow of lubricating fluid at a known and constant flow rate to the tool or the supply of air. Such control can include operation of the pump, monitoring of the system, such as through one or more sensors, or otherwise. Such a flow rate can be input to the controller, such as from a graphical user interface, in one non-limiting example.

At step 250, the method 200 can optionally include maintaining system pressure with a pressure maintenance valve to minimize a delay between reception of a start signal and supply of the lubricating fluid. The pressure maintenance valve maintains system pressure between machining operations. Thus, the need to re-pressurize the system is minimized.

At step 260, the method 200 can optionally include operating two or more volumetric flow pumps such that changes in stroke direction are at different times. The system can include multiple volumetric flow pumps to maintain the continuous, known, constant flow rate of the lubricating fluid. The multiple pumps can be organized to operate at times when stroke transition of the pump is offset to minimize the interruption of a change in stroke direction of a single pump system.

Optionally, the method 200 can include, at 270, minimizing changes in the continuous supply of lubricating fluid by minimizing changes in volume in the high pressure areas of the lubricating fluid path by maximizing the modulus of elasticity of the supply lines in the lubricating fluid path. Specifically, the elements such as fluidic channels and conduits can have the high modulus of elasticity to prevent expansion of the elements when under pressure. Expansion of the lubricant supply channel volume can discretely alter the flow rate. Minimizing the potential for such expansion helps to maintain the continuous, constant, and known supply of lubricating fluid.

Additionally, the method 200 can optionally include, at 280, minimizing changes in the continuous supply of lubricating fluid by minimizing the volume of entrained or entrapped air along the high pressure areas of the lubricant supply line 41 or the high pressure region 45. Specifically, valves, rotating union or other elements are designed and manufactured to eliminate cavities where air can be trapped or are given methods of removing any trapped air. For example, bleed air outlets or valves can be integrated along the lubricant supply line at areas of anticipated air collection to remove any such collected air. An additional example includes eliminating cavities along the high pressure region 43 of the lubricant supply line 41, such as those resulting from the extension of a drill tip, or loose tolerances to ensure fit of components.

Similarly, all elements in the high pressure lubricating fluid path are designed and manufactured to minimize cavity sizes and conduit diameters to minimize total lubricant volume, and thus the amount of entrained air. The optimum internal fluid conduit diameter is a function of the needed flow rate of the supply of lubricating fluid, the induced pressure increase caused by the reduced diameter, the required velocity of the flow of lubricant, or a combination thereof. The diameter can be minimized, while maintaining the continuous, known, and constant flow of lubricant. Such a sufficient flow can be based upon the backpressure of the system. As diameter is decreased, pressure required to maintain the flow of lubricant through the high pressure region is increased, increasing the overall backpressure. A balance can be struck between pressure, velocity, and diameter of tubing in the high pressure lubricant supply region to minimize the diameter and increased backpressure, while maintaining the flow rate of the lubricating fluid. Compression of air in the lubricant supply channel volume can discretely alter the flow rate. Minimizing the potential for such compression helps to maintain the continuous, constant, and known supply of lubricating fluid.

It should be appreciated that the system permits control of a volume and pressure of both air and lubricating fluid being provided to a spindle or tool for use with MQL machining. The volumetric flow pump can be a dual action positive displacement pump, having at least one input and one output such that a wide range of lubrication flows can be precisely delivered. The dual-action pump enables a continuous flow of lubricating fluid at a desired volume and pressure such that exacting delivery of lubricating fluid in combination with air is provided during machining operations. Such a system providing for the exact required amounts reduces waste of lubricating fluid. Minimizing wasted lubricating fluid reduces operational costs as well as the environmental impact us such operations.

The volumetric pump does not need calibration of the fluid output itself; however using its known output has secondary benefits in calibrating other sensors in the system. Most fluid flow sensors that work at the very low flow rates are based on measuring changes in fluid properties, such as the amount of heat the fluid absorbs as it passes over a heating element. This requires a per-fluid calibration. However, because the volumetric pump independently delivers a known amount of fluid, the calibration of this sensor can be done automatically and programmatically. A known amount of fluid can be pumped through the sensor and back into the fluid supply allowing an accurate and automated calibration.

It should be appreciated that the system permits control of a volume and pressure of air and lubricating fluid being provided to a spindle or tool for use with MQL machining. The dual-action pump enables a continuous flow of lubricating fluid at a desired volume and pressure such that exacting delivery of lubricating fluid in combination with air is provided during machining operations.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A minimum quantity lubrication system for supplying air and lubrication to a tool, the minimum quantity lubrication system comprising:
   an air supply line configured to fluidly couple to the tool;
   an air supply valve fluidly coupled to the air supply line and controlling a volumetric flow rate of air through the air supply line;
   a lubricant supply line having at least a portion that is non-expandable and at least a portion that is minimally expandable, the lubricant supply line having a high modulus of elasticity and configured to fluidly couple to the air supply line;
   at least one volumetric flow pump fluidly coupled to the lubricant supply line and supplying a supply of lubricant at a lubricant flow rate through the lubricant supply line; and
   a controller operably coupled to the air supply valve and the volumetric flow pump;
   wherein the controller operates the volumetric flow pump to supply a continuous flow of the supply of lubricant at a known and constant lubricant flow rate to the air supply line.

2. The minimum quantity lubrication system of claim 1 wherein the volumetric flow pump supplies the continuous supply of lubricant at the known and constant lubricant flow rate, the volumetric flow pump configured to maintain the lubricant flow rate unimpeded by a backpressure of up to 10 bar.

3. The minimum quantity lubrication system of claim 1 wherein the at least one volumetric flow pump is a dual action positive displacement pump.

4. The minimum quantity lubrication system of claim 3 wherein the dual action positive displacement pump has at least one input and one output to support a wide range of lubrication flow rates.

5. The minimum quantity lubrication system of claim 3 wherein the dual action positive displacement pump is driven by a piston, wherein a rate at which the piston is driven by the controller can be used to monitor and control the lubrication flow rate.

6. The minimum quantity lubrication system of claim 5 wherein control of the piston drive rate by the controller can reduce the number of piston pump transitions by changing stroke direction of the piston between lubrication operations.

7. The minimum quantity lubrication system of claim 5 wherein the rate at which the controller drives the piston is accelerated or decelerated to minimize transition time during a change in stroke direction of the piston while maintaining the lubricant flow rate.

8. The minimum quantity lubrication system of claim 1 wherein the at least one volumetric flow pump is two or more volumetric flow pumps and the two or more volumetric flow pumps are organized to minimize changes in the lubricant flow rate during a change in direction of a piston for one of the two or more volumetric flow pumps.

9. The minimum quantity lubrication system of claim 1 further comprising a spindle vent valve located downstream of the air supply valve and upstream of the tool, the spindle vent valve configured to maintain an air pressure upstream of the spindle vent valve while relieving an air pressure downstream of the spindle vent valve to allow for removing the tool.

10. The minimum quantity lubrication system of claim 1 wherein the lubricant supply line is adapted to minimize cavities along the lubricant supply line to minimize a collection of air within the cavities.

11. The minimum quantity lubrication system of claim 1 wherein the lubricant supply line is configured to minimize the total volume of lubricant within the lubricant supply line, while maintaining the known and constant lubricant flow rate.

12. The minimum quantity lubrication system of claim 1 further comprising a pressure maintenance valve provided along the lubricant supply line and located immediately upstream of the tool, wherein the pressure maintenance valve maintains a pressure along the lubricant supply line to minimize a wait time between receiving a start signal at the controller and a delivering of the supply of lubricant to the air supply line or the tool.

13. The minimum quantity lubrication system of claim 1 further comprising a fluid flow meter in fluid communication with the lubricant supply line and communicatively coupled to the controller, wherein the volumetric flow pump can automatically calibrate the fluid flow meter to the supply of lubricant.

14. The minimum quantity lubrication system of claim 1 wherein the lubricant supply line is free of manufacturing imperfections so as to minimize cavities along the lubricant supply line to minimize a collection of air within the cavities.

15. The minimum quantity lubrication system of claim 1 wherein the lubricant supply line has minimal manufacturing imperfections so as to minimize cavities along the lubricant supply line to minimize a collection of air within the cavities.

16. The minimum quantity lubrication system of claim 1 wherein the lubricant supply line has elements, such as valves or rotating unions, that are adapted to minimize cavities along the lubricant supply line to minimize a collection of air within the cavities.

17. The minimum quantity lubrication system of claim 1 wherein the lubricant supply line has a minimized diameter so as to minimize the total volume of lubricant within the lubricant supply line, while maintaining the known and constant lubricant flow rate.

18. The minimum quantity lubrication system of claim 1 wherein the lubricant supply line has elements, such as valves and couplers, having internal cavities sized and shaped to minimize the total volume of lubricant within the lubricant supply line, while maintaining the known and constant lubricant flow rate.

* * * * *